Jan. 23, 1968   W. W. SMITH ET AL   3,365,567
ELECTRIC STEAM GENERATOR
Filed June 21, 1965

INVENTORS
WOODROW W. SMITH
WOODROW F. SMITH
BY
Salvatore G. Militana,
attorney

United States Patent Office 3,365,567
Patented Jan. 23, 1968

3,365,567
ELECTRIC STEAM GENERATOR
Woodrow W. Smith, 12455 NW. 13th Ave. 33167, and Woodrow F. Smith, 11618 NW. 7th Ave. 33168, both of Miami, Fla.
Filed June 21, 1965, Ser. No. 465,695
1 Claim. (Cl. 219—272)

ABSTRACT OF THE DISCLOSURE

An electric steam generator having a thermostat connected in series with a heating coil, a double pole switch, and a magnetic low water cut-off switch and a second switch connected in parallel with the thermostat at the position of the magnetic switch and the heating coil for rendering the thermostat ineffectual when high temperature steam is desired.

---

This invention relates to steam producing appliances and is more particularly directed to an electric steam generator.

A principal object of the present invention is to provide an electric steam generation which maintains water in a tank from 160 to 170 degrees F. and upon closing a second switch immediately obtain hot dry steam for a steam bath.

Another object of the present invention is to provide an electric steam generator that is small and compact in size, simple in operation, inexpensive in cost and will produce steam within a relatively short time after closing the switch.

A further object of the present invention is to provide an electric steam generator with a thermostatically controlled heating element that normally maintains the water at a predetermined temperature whereby the thermostat is by-passed when it is desired to bring the temperature of the water to steam condition.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claim.

Figure 1:
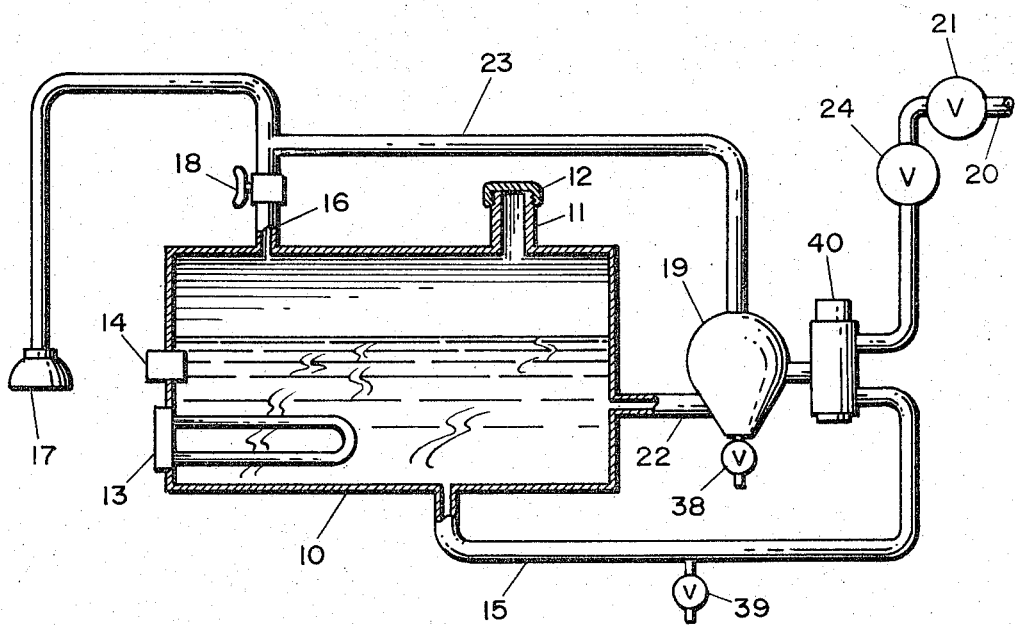
FIGURE 1 is a schematic diagram of an electric steam generating system.

Referring to the drawing wherein like numerals are used to designate similar parts throughout the several views, the numeral 10 refers to a water tank having a piped opening 11 on which a removable cap 12 is threadedly mounted. Within the tank 10 is an electrical heating element 13 and a thermostat element 14. A water inlet 15 is connected to the bottom wall of the tank 10 while a steam outlet pipe 16 is connected to the topmost portion of the tank 10. The steam outlet pipe 16 extends to an open end spray head similar to a shower head 17 which is most aptly mounted in an enclosed shower stall. A steam safety valve 18 is mounted on the outlet pipe 16 in proximity to the water tank 10.

The inlet pipe 15 is connected to a liquid level regulator device 40 also known as a low water cutoff and automatic feeder combination shown and described in detail in Reissue Patent No. 19,558 for Boiler Feed Control. The inlet pipe 15 of the tank 10 is directly connected to the feeder device 40 which in turn receives the flow of water through an inlet pipe 20. The pipe 20 that is provided with a check valve 24 and a shut-off valve 21 is connected to a source of water (not shown).

As shown and described in detail in the Carlson patent, the cut-off device 19 which is joined to the feeder device 40 is connected by pipes 22 and 23 which extend to the tank 10 and the tank outlet pipe 16, respectively. The pipes 22 and 23 permit the cut-off device 19 to respond to the water level in the tank 10. If the water level in the tank 10 drops below a predetermined position, this will be reflected in the water cut-off device 19 to operate a shut-off valve in the feeder device 40 and permit water to flow to the pipe 15 and into the tank 10. When the predetermined water level has been reached in the tank 10, the cut-off device 19 operates the valve in the feeder device 40 to cut-off the flow of water to the pipe 15.

Figure 2:
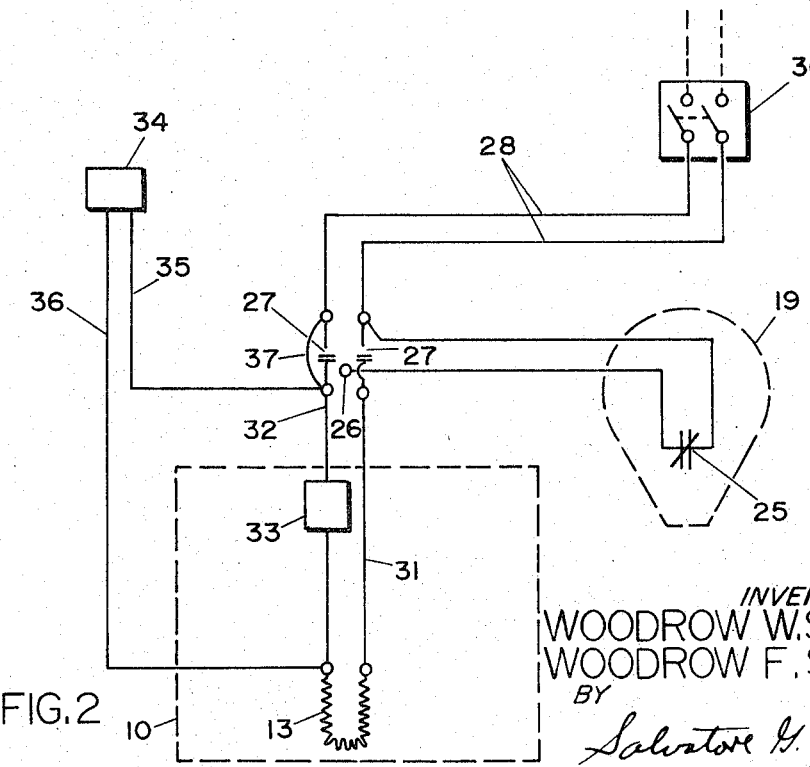
FIGURE 2 is a schematic diagram of the electrical system thereof.

As best shown by FIGURE 2 within the low water cut-off device 19 there is a conventional low water cut-off switch 25 which deenergizes the circuit as explained hereinafter when the level of water drops below a predetermined position. The low water cut-off switch 25 is connected to a magnetic contact holding coil 26 that bridges a gap 27 in the wires 28. The wires 28 extend to a double pole switch 30, the latter being connected to a source of electricity (not shown). The magnetic contact holding coil 26 is connected by wires 31 and 32 that extend to the water heater element 13. In series with the water heater element 13 is a thermostat control 33 which is positioned on the electric wire 32. The thermostat control maintains the water at a temperature ranging from 160 to 170 degrees F. when the switch 30 is set and the low water cut-off switch 25 is in its closed position.

A second switch 34 is provided to heat the water from 160° F. to a hot dry steam condition in the relatively short time of a few minutes. The switch 34 is connected by a wire 35 to the wire 32 and a wire 36 to the heater element 13. When the switch 34 is closed the thermostat 33 will be by-passed by wires 35 and 36 and electricity will flow to the heater element along wires 28 and 31 which are the hot legs of the circuit. The gap 27 on the ground leg of the circuit is bridged by a wire 37. Drain cocks 38 and 39 are provided on the low water cut-off 19 and the water inlet line 39 respectively.

In the normal operation of my electric steam generator, I adjust the low water cut-off 19 and automatic feeder 40 to maintain the level of water in the tank 10 about two-thirds full. The tank 10 is preferably 12 gallons in capacity and the heater element 13 having a 3.5 kw. rating. Upon closing the double throw switch 30, the heater element 13 will heat the water in the water tank 10 and the thermostat will maintain the water at from 160 to 170 degrees F. Now when a person wishes to take a steam bath he closes the switch 34 which by-passes the thermostat 33 permitting the uninterrupted flow of electricity to the heater element 13. In less than three minutes hot steam will be generated, flowing out of the tank 10 through the outlet pipe 16 and be discharged through the spray head 17. The low water cut-off and automatic feeder combination 40 and 19 will maintain the desired water level in the tank 10. In the event the water level in the tank 10 drops to a dangerous position in the tank 10, the low water cut-off switch 25 will open the circuit to denergize the magnetic holding coil 26 which in turn opens the main circuit at the gap 27 to prevent electricity from flowing to the heater element 13 until the proper water level has been acquired in the tank. When such occurs, the low water cut-off switch 25 will be brought to its closed position to energize the magnetic holding coil 26 which bridges the gap 27 and completes the circuit to the heater element 13.

Having disclosed our invention, what we claim as new and desire to secure by Letters Patent of the United States is:

1. In an electric steam generator system having a tank, low water cut-off and automatic feeder means connected to said tank, the combination comprising a heating element mounted in said tank, a double pole switch, a magnetic contact switch mounted in series with said double pole switch, low water switch means connected to said magnetic contact switch for actuating said last named switch, said heating element mounted in series with said magnetic contact switch, a thermostat control mounted in series between said magnetic contact switch and said heating element for controlling the flow of electricity to said heating element, and a single pole switch mounted between said magnetic contact switch and said heating element in parallel with said thermostat control whereby said thermostat control is rendered ineffective to influence said heating element when said single pole switch is actuated to its closed position and said heating element operates at its maximum capacity.

References Cited
UNITED STATES PATENTS

| | | | |
|---|---|---|---|
| 1,561,243 | 11/1925 | Keene | 219—333 X |
| 2,443,359 | 6/1948 | Newhouse | 122—448 X |
| 2,627,015 | 1/1953 | Hackman | 219—333 X |
| 2,807,889 | 10/1957 | Dunkelman | 219—364 X |
| 2,880,300 | 3/1959 | Reimers et al. | 219—324 |
| 3,044,181 | 7/1962 | Berenbaum | 219—364 X |

RICHARD M. WOOD, *Primary Examiner.*

C. L. ALBRITTON, *Assistant Examiner.*